United States Patent [19]
Endo et al.

[11] Patent Number: 5,325,212
[45] Date of Patent: Jun. 28, 1994

[54] FACSIMILE BROADCASTING SYSTEM

[75] Inventors: Mitsunori Endo, Tokyo; Satoshi Nohara, Saitama; Rolf Toft, Tokyo, all of Japan

[73] Assignee: Sony Corporation, Tokyo, Japan

[21] Appl. No.: 135,950

[22] Filed: Oct. 12, 1993

Related U.S. Application Data

[63] Continuation of Ser. No. 703,829, May 21, 1991, abandoned.

[30] Foreign Application Priority Data

May 29, 1990 [JP] Japan .................. 2-139253

[51] Int. Cl.$^5$ .................. H04N 1/32; H04N 1/04
[52] U.S. Cl. .................. 358/468; 358/479; 358/434; 358/438
[58] Field of Search ............ 358/425, 434, 438, 443, 358/468, 479

[56] References Cited

U.S. PATENT DOCUMENTS

| | | | |
|---|---|---|---|
| 4,251,836 | 2/1981 | Moreau | 358/409 |
| 4,652,934 | 5/1987 | Muroya et al. | 358/426 |
| 4,991,201 | 2/1991 | Tseng | 455/45 |
| 5,016,115 | 3/1991 | Calkins | 358/442 |
| 5,050,208 | 9/1991 | Wada | 379/100 |
| 5,070,404 | 12/1991 | Bullock et al. | 358/434 |

FOREIGN PATENT DOCUMENTS

| | | | |
|---|---|---|---|
| 63-219262 | 9/1988 | Japan | H04N 1/00 |
| 0257060 | 2/1990 | Japan | H04N 1/21 |

OTHER PUBLICATIONS

Patent Abstracts of Japan, vol. 12, No. 150, (E606) May 10, 1988 (Okabe).
Patent Abstracts of Japan, vol. 13, No. 359 (E804), Aug. 10, 1989 (Konishi).
Patent Abstracts of Japan, vol. 7, No. 288 (E218), Dec. 22, 1983 (Wada).
Patent Abstracts of Japan, vol. 12, No. 54, (E-583) Feb. 18, 1988 (Soda).
Patent Abstracts of Japan, vol. 15, No. 187 (E-1067) May 14, 1991 (Nishida).
Japanese Electronic Engineering, No. 48, Nov. 1970, pp. 24–31.
NHK Laboratories Note, No. 187, Jul. 1975, pp. 1–17 (Numaguchi).

*Primary Examiner*—Richard E. Chilcot, Jr.
*Assistant Examiner*—Rafael Bacares
*Attorney, Agent, or Firm*—Lewis H. Eslinger; Jay H. Maioli

[57] ABSTRACT

A facsimile broadcasting receiver comprising an index program detector and a recording means, the detector detecting an index program number from a facsimile signal. The detected index program number is recorded into the recording means so that the corresponding index program will be automatically recorded.

3 Claims, 2 Drawing Sheets

FACSIMILE BROADCASTING SYSTEM

This is a continuation of application Ser. No. 07/703,829 filed May 21, 1991, now abandoned.

BACKGROUND OF THE INVENTION

1. Field of the Invention

The present invention relates to a TV facsimile broadcasting receiver for receiving broadcast facsimile signal transmissions.

2. Description of the Prior Art

In the near future, what is known as facsimile broadcasting is expected to commence. This broadcast involves having the TV broadcast audio signal multiplexed in frequency with a facsimile signal. The facsimile broadcast is to be basically received by reservation. That is, the TV facsimile broadcasting receiver has a program reservation function for receiving broadcast facsimile signals of previously reserved programs. To reserve a desired program requires at least having the receiver input the number representing that program. That in turn necessitates preparation of an index listing the names and numbers of programs that may be received. Thus it is envisaged that an index program will be broadcast every one or two hours. Recording this index program is convenient for TV viewers who may wish to record any of the programs listed in the index.

SUMMARY OF THE INVENTION

It is therefore an object of the invention to provide a facsimile broadcasting receiver capable of automatically recording index programs.

In carrying out the invention and according to one aspect thereof, there is provided a facsimile broadcasting receiver utilizing index programs, the receiver comprising: a receiving means for receiving facsimile broadcast; a decoding means for decoding data sequence of the receiving means; and an index program detector for detecting the index program from data sequence of the decoding means.

According to another aspect of the invention, there is provided a facsimile broadcasting receiver comprising a memory for memorizing a decoded facsimile signal, and a controller for providing controls so as to record the facsimile signal to the memory when an index signal is detected by the index program detector.

According to a further aspect of the invention, there is provided a facsimile broadcasting receiver comprising a G3 format facsimile decoder.

According to an even further aspect of the invention, there is provided a facsimile broadcasting receiver comprising a printer for printing the decoded facsimile signal or a facsimile signal having appeared at an output of the memory.

According to another aspect of the invention, there is provided a facsimile broadcasting receiver wherein the controller stops the printing operation of the printer when a program end signal is detected.

DESCRIPTION OF THE PREFERRED EMBODIMENT

The preferred embodiment of the present invention will now be described with reference to the accompanying drawings.

Figure 1:
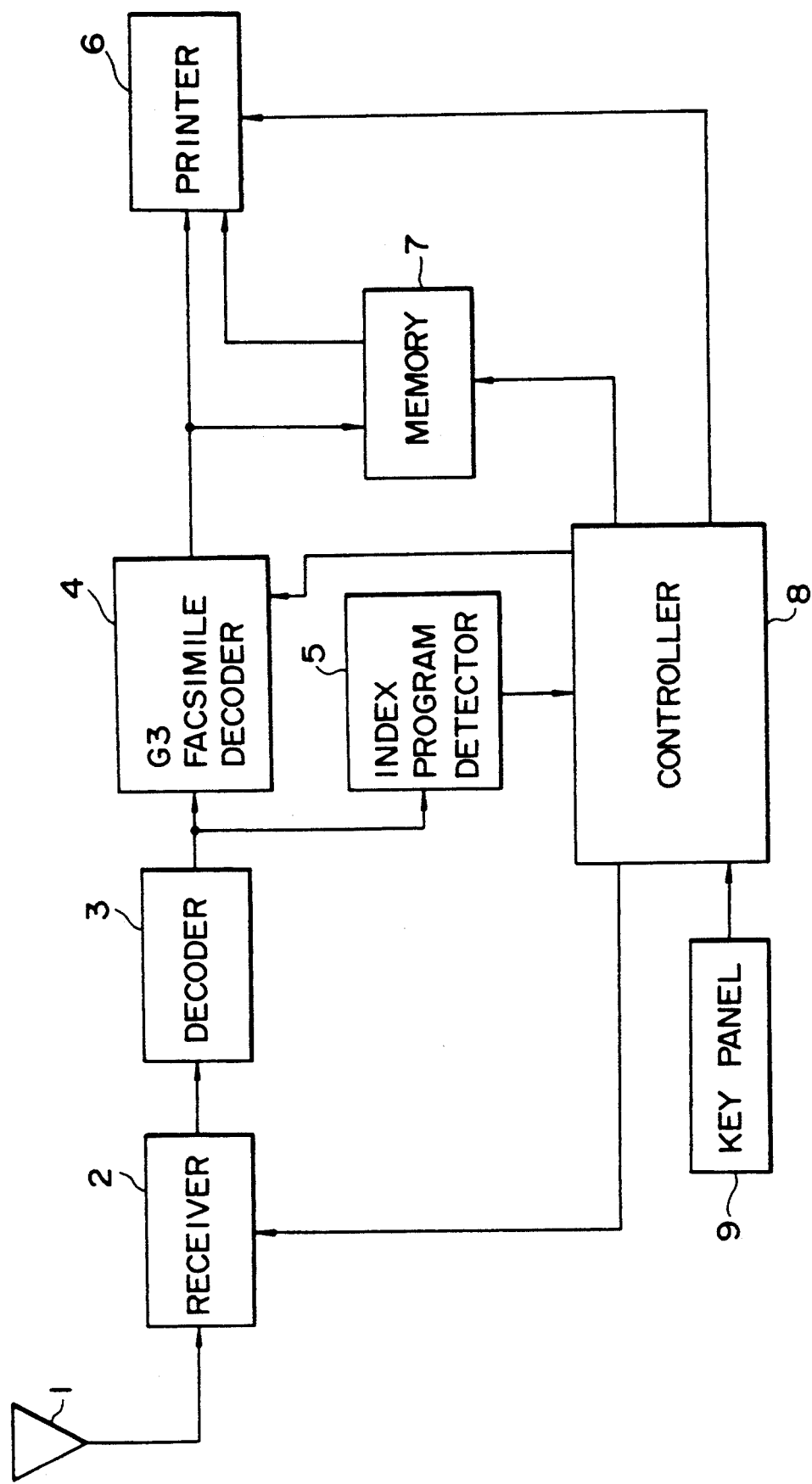
FIG. 1 is a circuit block diagram of a TV facsimile broadcasting receiver as a preferred embodiment of the invention.
Figure 2:
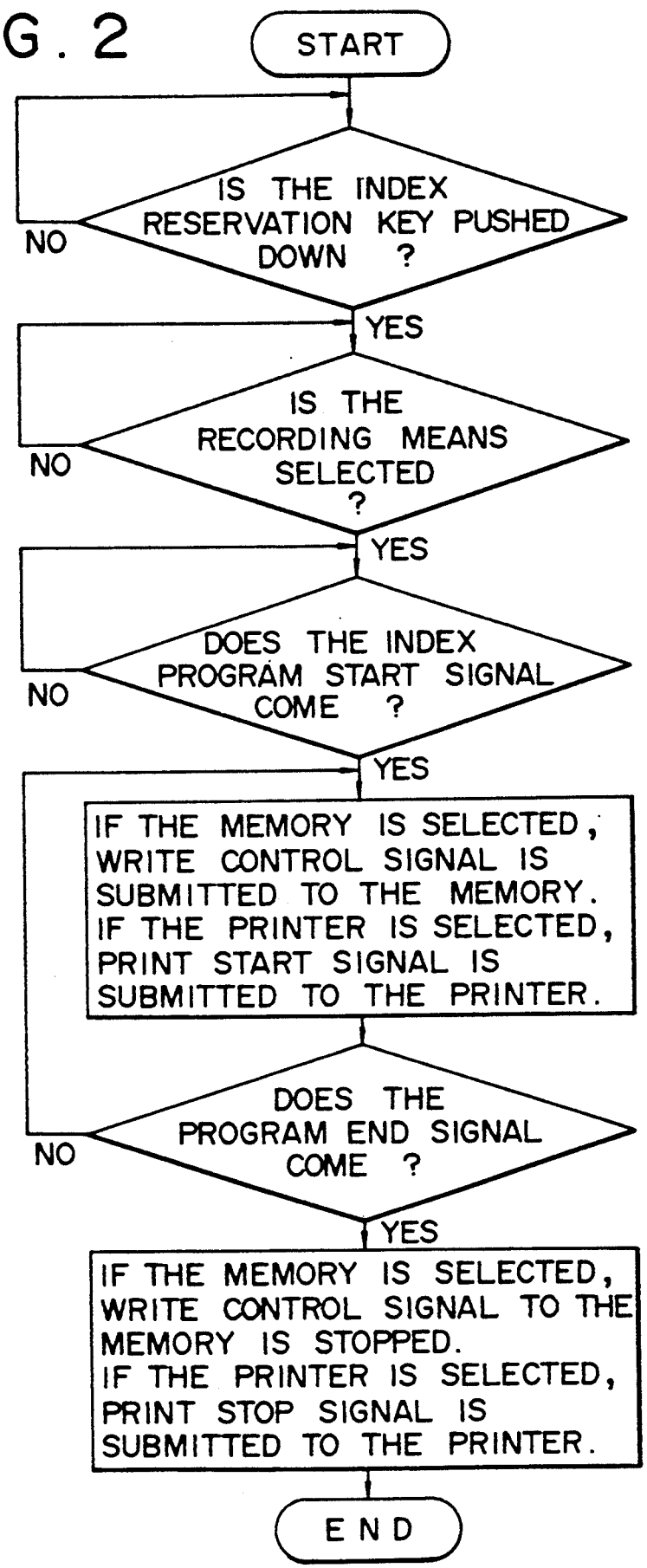
FIG. 2 is a flowchart of steps to be carried out by the embodiment in the index program reservation mode.

FIGS. 1 and 2 illustrate how the embodiment is constructed and how it works. The typical time sequence of facsimile broadcast is depicted in the table below.

| | | | Time Sequence Table of transmitted data Start of program | | | |
|---|---|---|---|---|---|---|
| | First 6 frames | Next 6 frames | | 3 packets or more | 6 frames | |
| Data Sequence | Network data or blank data | Page 1 control data | Page 1 picture data | Page end data | Page 2 control data | Page 2 picture data |
| Receive operation | Receiver Synchronization established | Preparations for operation | Printer operation or storage | Printer operation | Cutter operation and preparation of next page | Printer operation or storage |

Page control data contains information such as a program number, page numbers and a total page count. Page end data designates the end of the picture data for one page when that page is found inside a program; the page end data acts as program end data if attached to the last page of the program.

Referring to FIG. 1, the output of an antenna 1 is introduced into a receiver 2. On receiving a TV signal, the receiver 2 extracts therefrom a facsimile signal that was multiplexed with the audio signal of the TV signal, and forwards the facsimile signal to a decoder 3. In turn, the decoder 3 decodes the facsimile signal that was coded in four phases. The decoded facsimile signal is output to a G3 facsimile decoder 4 as well as to an index program detector 5. The G3 facsimile decoder 4 expands the facsimile signal that was compressed according to G3 standards. The expanded facsimile signal is output both to a printer 6 and to a memory 7. After detecting an index program number in the facsimile signal, the index program detector 5 outputs an index program start signal to a controller 8; upon detection of a page end data of the last page, the detector 5 sends a program end data to the controller 8. The printer performs its printing operation from the time it receives a print start data from the controller 8 until the time a print stop data is received therefrom. Write and read control data from the controller 8 control write and read operations to and from the memory 7. The read data is output to the printer 6. The controller 8 controls the receiver 2, G3 facsimile decoder 4, printer 6 and memory 7 in accordance with various modes selected at a key panel 9. When the index program reservation mode is selected, the steps in the flowchart of FIG. 2 are carried out. The key panel 9 has a number of control keys including an index reservation key, a recording means selection key and a memory reading key. The index reservation key is used to enter or leave index reservation mode. The recording means selection key allows either or both of the printer 6 and memory 7 to be selected as the recording means. The memory reading key reads out contents of the memory 7 when operated.

Referring to FIG. 2, pushing the index reservation key on the key panel 9 in the above setup selects the index program reservation mode. Then the recording means selection key is used to select either or both of the printer 6 and memory 7 as the recording means. When the index program detector 5 detects an index program number from the facsimile signal output by the decoder 3, an index program start data is output to the controller 8. In response, the controller 8 sends a write control data to the memory 7 if the memory has been selected as the recording means. In this case, the facsimile signal is stored in the memory 7. If the printer 6 has been selected as the recording means, the controller 8 outputs a print start data to the printer 6 so that the printer 6 will print out the facsimile signal contents. When the index program detector 5 detects a page end data of the last page from the facsimile signal, a program end data is output to the controller 8. In turn, the controller 8 stops the write control signal supplied to the memory 7 if the memory 7 has been selected as the recording means. This stops the writing of the facsimile signal to the memory 7. If the printer 6 has been selected as the recording means, a print stop data is output to the printer 6, and the printer 6 stops its printing operation accordingly. In this manner, the index program is stored into the memory 7 if the memory 7 has been selected as the recording means. Alternatively, the index program is printed out on printing paper by the printer if the printer 6 has been selected as the recording means. If necessary, the index program stored in the memory 7 is printed out by the printer 6 when the memory reading key is pushed. Because a list of index programs is readily acquired as described, viewers can reserve desired programs with ease by taking a quick look at the list.

With this embodiment, the printer 6 and memory 7 are provided as the recording means. One alternative to this configuration is that only one of these two devices is provided as the recording means. Another alternative is the use of any other suitable apparatus as the recording means.

As described, the index program detector detects index program numbers from the facsimile signal. On detecting an index program number, the index program detector records the number using the recording means. The apparatus embodying this scheme provides its users with a benefit, among others, of having index programs automatically recorded.

As many apparently different embodiments of the present invention may be made without departing from the spirit and scope thereof, it is to be understood that the invention is not limited to the specific embodiments thereof except as defined in the appended claims.

What is claimed is:

1. A facsimile broadcasting receiver for detecting and recording index programs, said receiver comprising:
   receiving means for receiving a facsimile broadcast signal containing a data sequence, said data sequence including an index program which includes a list of index data for a plurality of other programs being broadcast;
   decoding means connected to said receiving means for decoding said data sequence;
   an index program detector connected to said decoding means and responsive to said decoded data sequence for detecting said index program;
   a memory connected to said decoding means for storing said decoded data sequence;
   a user operated selector for selecting whether to record and/or print said list of index data;
   a printer connected to an output of said memory and to an output of said decoding means for printing said decoded data sequence; and
   a controller having an input connected to an output of said index program detector and an input connected to said user operated selector for controlling said memory and said printer to selectively store and/or print said list of index data in response to the output of said user operated selector means.

2. A facsimile broadcasting receiver as claimed in claim 1, wherein said decoding means includes a G3 format facsimile decoder for expanding and decoding said facsimile signal in accordance with G3 standards and producing said decoded data sequence fed to said memory and to said printer.

3. A facsimile broadcasting receiver as claimed in claim 1, wherein said facsimile broadcast signal contains a program end signal and said controller stops the printing operation of said printer when said program end signal is detected.

* * * * *